United States Patent
Kulshrestha et al.

(10) Patent No.: US 12,014,099 B2
(45) Date of Patent: Jun. 18, 2024

(54) MULTI-DEVICE AWARENESS FOR CASTING AND CONTENT DELIVERY

(71) Applicant: Google LLC, Mountain View, CA (US)

(72) Inventors: Achin Kulshrestha, Kirkland, WA (US); Robert Bowering, Kitchener (CA); Maxwell Spear, San Francisco, CA (US); Xavier Benavides Palos, San Francisco, CA (US); Aveek Purohit, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/653,957

(22) Filed: Mar. 8, 2022

(65) Prior Publication Data

US 2023/0305788 A1    Sep. 28, 2023

(51) Int. Cl.
*G06F 3/048* (2013.01)
*G06F 3/0346* (2013.01)
*G06F 3/14* (2006.01)
*G06V 20/20* (2022.01)
*H04W 4/20* (2018.01)

(52) U.S. Cl.
CPC .......... *G06F 3/1423* (2013.01); *G06F 3/0346* (2013.01); *G06V 20/20* (2022.01); *H04W 4/20* (2013.01)

(58) Field of Classification Search
CPC ...... G06F 3/1423; G06F 3/0346; G06F 3/011; G06F 3/017; G06F 3/0304; G06V 20/20; H04W 4/20; G02B 27/017
See application file for complete search history.

(56) References Cited

U.S. PATENT DOCUMENTS

| 2012/0290657 | A1* | 11/2012 | Parks | H04M 1/72406 709/204 |
| 2015/0067580 | A1* | 3/2015 | Um | G06F 3/0481 715/781 |
| 2015/0113658 | A1 | 4/2015 | Zhong et al. | |
| 2016/0026253 | A1 | 1/2016 | Bradski et al. | |

(Continued)

FOREIGN PATENT DOCUMENTS

KR    102197886 B1    1/2021

OTHER PUBLICATIONS

International Search Report and Written Opinion for PCT Application No. PCT/US2022/080494, dated Mar. 2, 2023, 14 pages.

*Primary Examiner* — Aleksey Olshannikov
(74) *Attorney, Agent, or Firm* — Brake Hughes Bellermann LLP

(57) ABSTRACT

A system and method provides for the transfer of the execution of content, or the casting of content, from a first computing device to a second computing device. The casting may be performed in response to a detected lift event of the second computing device including the detection of movement of the second computing device from a stored state toward a position within a field of view of a user, and an identification event of the second computing device. including the detection or identification of the second computing device within a field of view of an image sensor of the first computing device, corresponding to a field of view of the user. Detection of both the lift event and the identification event may provide a relatively high level of assurance of user intent to cast the content from the first computing device to the second computing device.

24 Claims, 16 Drawing Sheets

(56) References Cited

U.S. PATENT DOCUMENTS

| | | |
|---|---|---|
| 2016/0140404 A1 | 5/2016 | Rosen |
| 2016/0364005 A1* | 12/2016 | Forest .................... G06F 3/017 |
| 2017/0060266 A1* | 3/2017 | Gao ...................... G06F 1/1694 |
| 2017/0060518 A1 | 3/2017 | Hong et al. |
| 2017/0277273 A1 | 9/2017 | Kauffmann et al. |
| 2018/0005429 A1 | 1/2018 | Osman et al. |
| 2021/0255461 A1* | 8/2021 | Watanabe ................ G09G 5/00 |
| 2022/0011580 A1 | 1/2022 | Muldoon et al. |

* cited by examiner

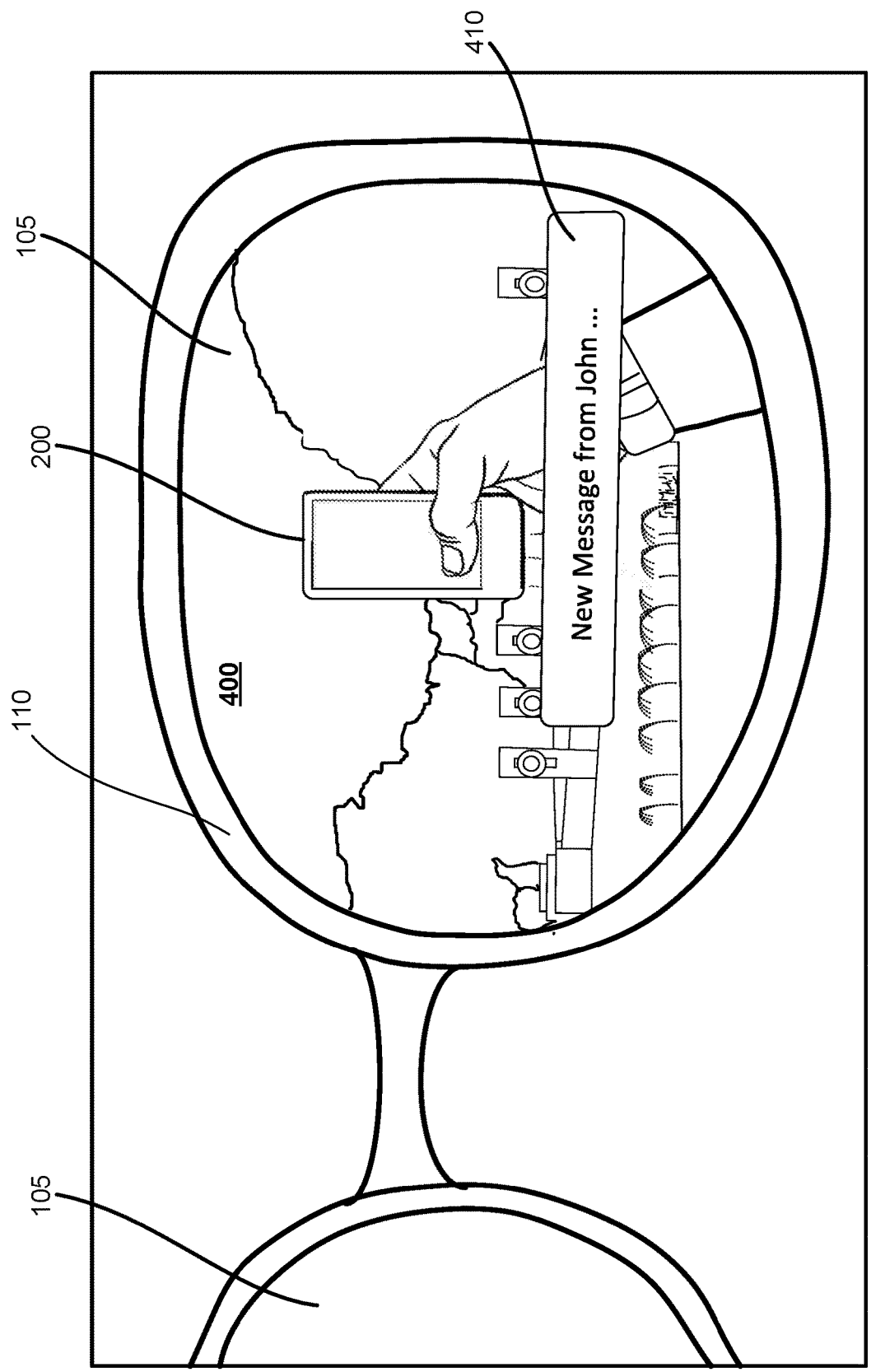

MULTI-DEVICE AWARENESS FOR CASTING AND CONTENT DELIVERY

BACKGROUND

Connected, or networked, or compatible devices allow users to consume, share and control content using different devices. Some systems rely on a series of user inputs to scan for and detect compatible devices, to initiate sharing and/or mirroring of content, to interact with content, to control compatible devices, and the like. This can result in a complicated and cumbersome user experience, and may discourage users from taking advantage of this capability.

SUMMARY

In one general aspect, a computer-implemented method includes detecting, by a processor of a second computing device that is operably coupled with a first computing device, that a first triggering condition has been met, the first triggering condition corresponding to a movement of the second computing device toward the first computing device; detecting, by the processor of the second computing device, that a second triggering condition has been met, the second triggering condition corresponding to a detection of the second computing device within a field of view of an image sensor of the first computing device; and transferring execution of content from the first computing device to the second computing device in response to the detecting that the first triggering condition and the second triggering condition have been met.

In some implementations, transferring the execution of the content includes transferring the execution of the content from the first computing device to the second computing device in response to determining that the second triggering condition has been met within a set period of time of determining that the first triggering condition has been met.

In some implementations, the first computing device is a head mounted computing device including a display device, and the second computing device is a handheld computing device including a display device. In some implementations, detecting the first triggering condition includes detecting a movement of the handheld computing device from a stored position toward a position within a field of view of a user of the head mounted wearable device corresponding to the field of view of the image sensor. In some implementations, detecting the second triggering condition includes detecting the first computing device within an image captured by an image sensor of the first computing device. In some implementations, detecting the first triggering condition includes storing the detected first triggering condition for a set period of time. In some implementations, transferring the execution of the content includes determining that the execution of the content is to be transferred from the first computing device, and transferring the execution of the content from the first computing device, in response to the detection of the second triggering condition while the first triggering condition is stored; and determining that the execution of the content is to remain with the first computing device in response to the detection of the second triggering condition after the set period of time has elapsed.

In some implementations, detecting the first triggering condition includes:
receiving, by the processor of the second computing device, data from at least one of an accelerometer or a gyroscope of the second computing device; and detecting the movement of the second computing device based on the data received form the at least one of the accelerometer or the gyroscope. In some implementations, the method includes updating a machine learning model of movement of the second computing device based on the data received from the at least one of the accelerometer or the gyroscope of the second computing device associated with the first triggering condition in response to a determination that the movement of the second computing device is an intentional movement of the second computing device into the field of view of the image sensor of the first computing device.

In some implementations, transferring the execution of the content from the first computing device to the second computing device includes executing the content on the second computing device, including providing access to additional information related to the executed content via a user interface device of the second computing device.

In another general aspect, a system includes a first computing device; a second computing device operably coupled with the first computing device, the second computing device including at least one processor and a memory storing instructions. When executed by the at least one processor, the instructions may cause the at least one processor to detect that a first triggering condition has been met, the first triggering condition corresponding to a movement of the second computing device toward the first computing device; detect that a second triggering condition has been met, the second triggering condition corresponding to a detection of the second computing device within a field of view of an image sensor of the first computing device; and transfer execution of content from the first computing device to the second computing device in response to detection that the first triggering condition and the second triggering condition have been met.

In some implementations, the instructions cause the at least one processor to transfer the execution of the content from the first computing device to the second computing device in response to determining that the second triggering condition has been met within a set period of time of determining that the first triggering condition has been met.

In some implementations, the first computing device is a head mounted computing device including a display device, and the second computing device is a handheld computing device including a display device. In some implementations, the instructions cause the at least one processor to detect a movement of the handheld computing device from a stored position toward a position within a field of view of a user of the head mounted wearable device corresponding to the field of view of the image sensor; and detect that the first triggering condition has been met in response to the detected movement. In some implementations, the instructions cause the at least one processor to detect the second triggering condition including detecting the first computing device within an image captured by an image sensor of the first computing device. In some implementations, the instructions cause the at least one processor to detect the first triggering condition including storing the detected first triggering condition for a set period of time. In some implementations, the instructions cause the at least one processor to transfer the execution of the content, including determine that the execution of the content is to be transferred from the first computing device, and transferring the execution of the content from the first computing device, in response to the detection of the second triggering condition while the first triggering condition is stored; and determine that the execution of the content is to remain with the first computing device in response to the detection of the second triggering condition after the set period of time has elapsed.

In some implementations, the instructions cause the at least one processor to detect the first triggering condition, including receive, by the processor of the second computing device, data from at least one of an accelerometer or a gyroscope of the second computing device; and detect the movement of the second computing device based on the data received form the at least one of the accelerometer or the gyroscope. In some implementations, the instructions cause the at least one processor to update a machine learning model of movement of the second computing device based on the data received from the at least one of the accelerometer or the gyroscope of the second computing device associated with the first triggering condition in response to a determination that the movement of the second computing device is an intentional movement of the second computing device into the field of view of the image sensor of the first computing device.

In some implementations, the instructions cause the at least one processor to transfer execute the content on the second computing device, including providing access to additional information related to the executed content via a user interface device of the second computing device.

BRIEF DESCRIPTION OF THE DRAWINGS

FIGS. 4A-4F illustrate the transfer of execution of content from a first user device to a second user device, in accordance with implementations described herein.

DETAILED DESCRIPTION

Figure 1:
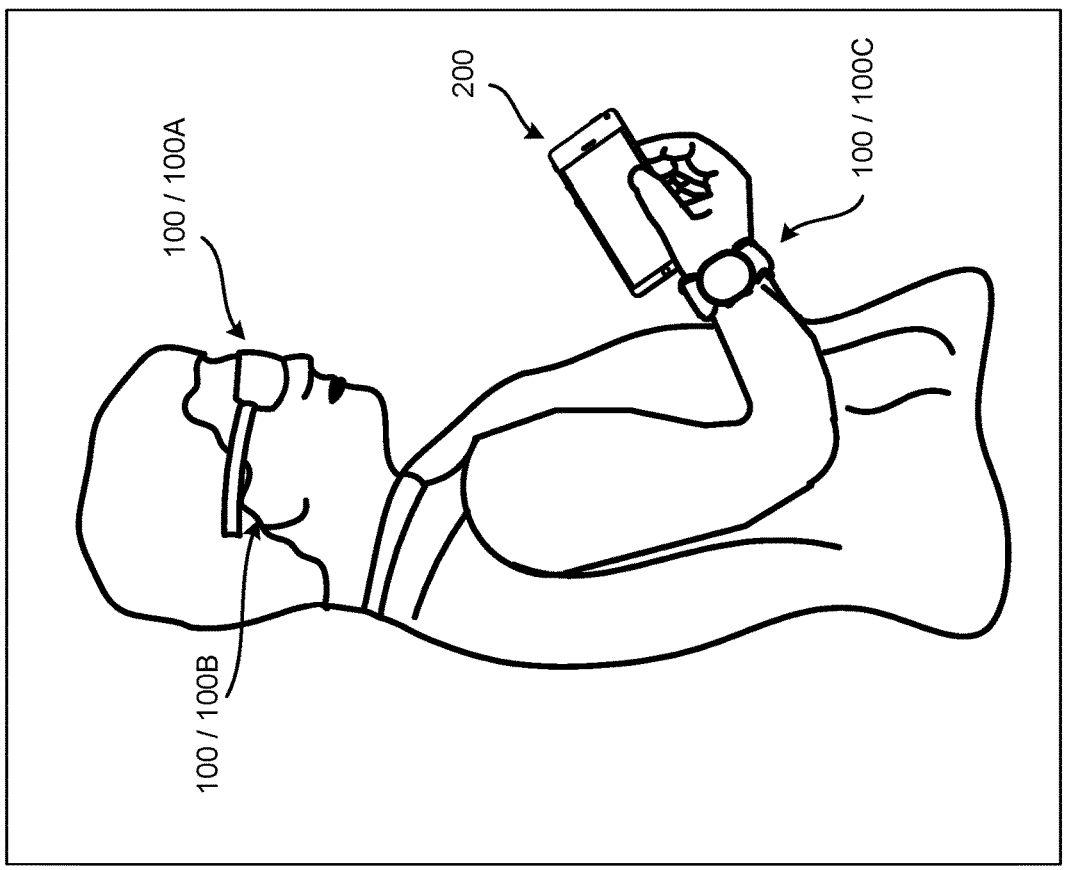
FIG. 1 illustrates an example system, in accordance with implementations described herein.

Users may consume content using a number of different types of devices, including, for example, handheld devices (smartphones and the like), wearable devices such as hand and/or wrist worn devices (smart watches, smart bracelets, smart rings and the like), head mounted devices (smart glasses, goggles, headsets and the like), ear worn devices, neck worn lanyard devices, other mobile devices (tablet computing devices, laptop computing devices and the like), desktop computing devices, smart televisions, smart speakers, and other such devices. In some situations, utility and functionality of these types of devices may be enhanced by the ability to transfer the execution of content, or share content for output by another device. For example, in some situations, display capability of a first device may be somewhat limited compared to a second device. In a situation in which the user, accessing content via the first device having somewhat constrained display capability, wants or needs access to additional information related to the content, it may be beneficial to transfer the execution of content to the second device. This may allow the user to access additional information, delve deeper into subject matter related to the content, and the like. This user experience may be enhanced, and capability of the system enhanced, if this transfer of the execution of content from the first device to the second device, can be accurately anticipated and carried out by the first and/or second device(s), without traditional user intervention that relies on, for example, accessing applications and/or menus, entering passwords, selecting devices and the like.

A system and method, in accordance with implementations described herein, provides for the transferring of the execution of content, executed and output by a first device, from the first device to a second device. For example, the execution of content may be transferred or shared for output from the first device to the second device in response to one or more previously set conditions, or signals, associated with the first device and/or the second device. In some examples, the one or more previously set conditions, or signals, may be associated with interaction between the first device and the second device. The satisfaction of the one or more previously set conditions, or signals, may provide a level of assurance of a user intent to transfer the execution of the content prior to transferring the execution of the content from the first device to the second device. The detection of the intent to transfer execution of content, or share content, or cast content, between devices in a shared system without specific user intervention, or with limited intervention, may enhance the utility and functionality of the system.

In some situations, the user experience may be improved by sharing or transferring the execution of content from a first device to a second device, for output by the second device. For example, a user viewing content on a display of a head mounted display device (such as, for example, smart glasses including a display) may prefer to view the content, access additional information, interact with the content, and the like, on an alternative device, such as, for example, a handheld device (such as, for example a smart phone) having a larger display capable of displaying additional information, access to additional information, facilitating interaction, and the like. The user experience may be further improved if the detection of the user intent to transfer the execution of content can be detected accurately, and accomplished with limited user intervention.

FIG. 1 illustrates a user in connection with an example system, in accordance with implementations described herein, in which a first computing device 100 is in communication with a second computing device 200. FIG. 1 illustrates an example in which the first computing device 100 can be one or more of a number of different wearable devices, including a first wearable device 100A in the form of an example head mounted display (HMD) device 100A, or smart glasses 100A, a second wearable device 100B in the form of an example wrist worn device 100B, or a smart watch 100B, and a third wearable device 100C, in the form of an example ear worn device 100C, or ear bud(s) 100C. In the example shown in FIG. 1, the user is holding a second computing device 200 in the form of a handheld device such as, for example, a smart phone. The first computing device 100 0 may communicate with, and exchange information with, the second computing device 200. The example system shown in FIG. 1 includes the first computing device 100 in the form of three different example wearable devices and the example second computing device 200 in the form of the handheld device such as a smart phone, simply for ease of discussion and illustration. The principles to be described herein may be applied to other systems including other types of devices that may be operated by the user. For example, principles to be described herein may be applied to wearable devices such as smart rings, smart pendants, and other such wearable devices. The principles to be described herein may be applied to other types of auxiliary devices such as tablet computing devices, laptop computing devices, external audio/video devices, and the like.

Hereinafter, systems and methods, in accordance with implementations described herein, will be described with respect to interaction between a first, wearable computing device 100 in the form of a head mounted display device, or smart glasses, and a second computing device 200 in the form of a smart phone, simply for purposes of discussion and illustration. As noted above, the principles to be described herein may be applied to other types of devices and/or combinations of devices operated by a user.

Figure 2B:
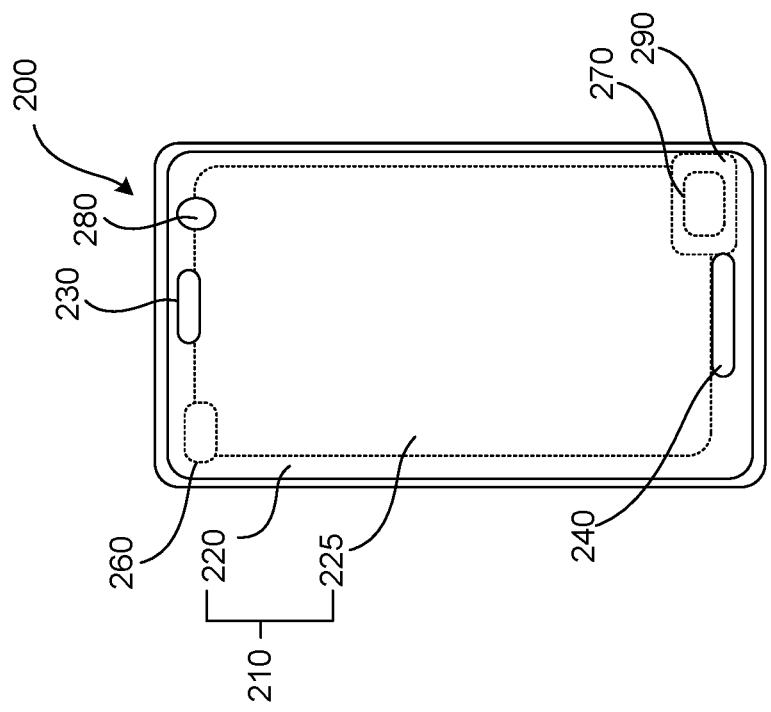
FIG. 2B is a front view of an example external computing device shown in FIG. 1.
Figure 2A:
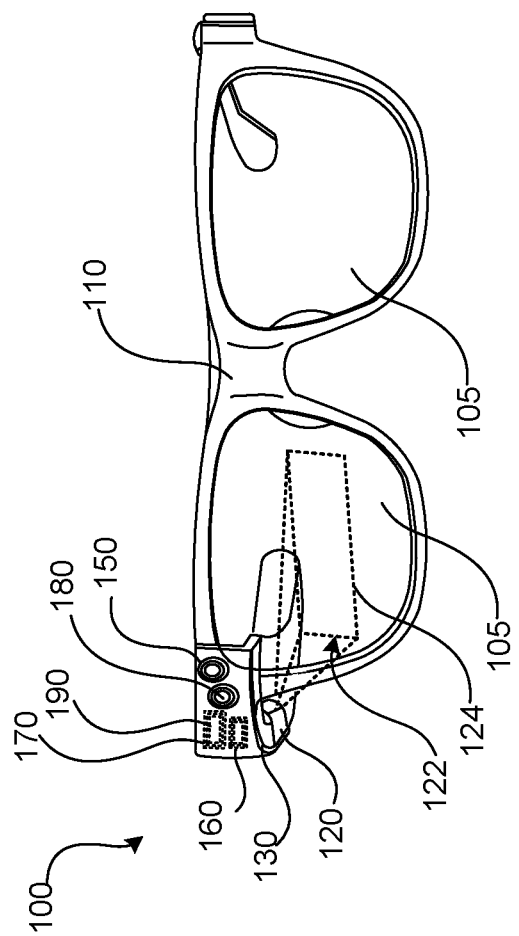
FIG. 2A is a front view of an example wearable computing device shown in FIG. 1.

FIG. 2A is a front view of the example first computing device 100 in the form of a head mounted display device, or smart glasses, worn by the user in FIG. 1. FIG. 2B is a front view of the example second, auxiliary computing device 200 in the form of a smart phone held by the user in FIG. 1.

As shown in FIG. 2A, the example wearable device 100 may include a frame 110, with a display device 120 coupled in the frame 110. An eye box 122 extends from the display device toward one or both lenses 105 coupled in the frame 110, for output of content at an output coupler 124 at which content, output by the display device 120, may be visible to the user. In some examples, the output coupler 124 may be substantially coincident with the lens(es) 105. In some examples, the display device 120 may include a see-through near-eye display. For example, the display device 120 may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world, for example, through the lens(es) 105, next to content (for example, digital images, user interface elements, virtual content, and the like) output by the display device 120. In some implementations, waveguide optics may be used to depict content output by the display device 120.

In some implementations, an audio output device 130, or speaker 130, may be coupled to the frame 110. In some implementations, an audio sensor 140, or audio input device 140, or microphone 140, may be coupled to the frame 110. The audio sensor 140 may detect audio signals, for example, in the form of voice commands, to be processed by the wearable device 100. The example wearable device 100 may include a sensing system 160 including various sensing system devices and a control system 170 including various control system devices to facilitate operation of the wearable device 100. The control system 170 may include a processor 190 operably coupled to the components of the control system 170. The wearable device 100 may also include an image sensor 180 (i.e., a camera 180). In some implementations, the image sensor 180, or camera 180 may be capable of capturing still and/or moving images. In some implementations, the image sensor 180, or camera 180, may be a depth camera that can collect data related to distances of external objects from the image sensor 180, or camera 180. In some implementations, the image sensor 180, or camera 180, may be a point tracking camera 180 that can, for example, detect and follow one or more optical markers on a device that is external to the wearable device 100. In some implementations, the wearable device may include an illumination device 150 that may selectively operate, for example, with the image sensor 180, or camera 180, for detection of objects in the field of view of the image sensor 180, or camera 180.

The example second, auxiliary computing device 200 in the form of a smart phone may include an interface device 210. In some implementations, the interface device 210 may function as an output device, including, for example, a display portion 220, allowing the interface device 210 to output information to the user. In some implementations, the interface device 210 may function as an input device, including, for example, a touch input portion 225 that can receive, for example, touch inputs from the user. In some implementations, the interface device 210 can function as an input device and an output device. In some implementations, the second computing device 200 includes an audio output device 230, or speaker 230. In some implementations, the second computing device 200 includes an audio sensor 240, or audio input device 240, or microphone 240 that detects audio signals for processing by the auxiliary device 200. In some implementations, the second computing device 200 includes an image sensor 280, or camera 280, that can capture still and/or moving images in the field of view of the image sensor 280, or camera 280. The second computing device 200 may include a sensing system 260 including various sensing system devices. The auxiliary device 200 may include a control system 270 including various control system devices and a processor 290, to facilitate operation of the second computing device 200.

Figure 3:
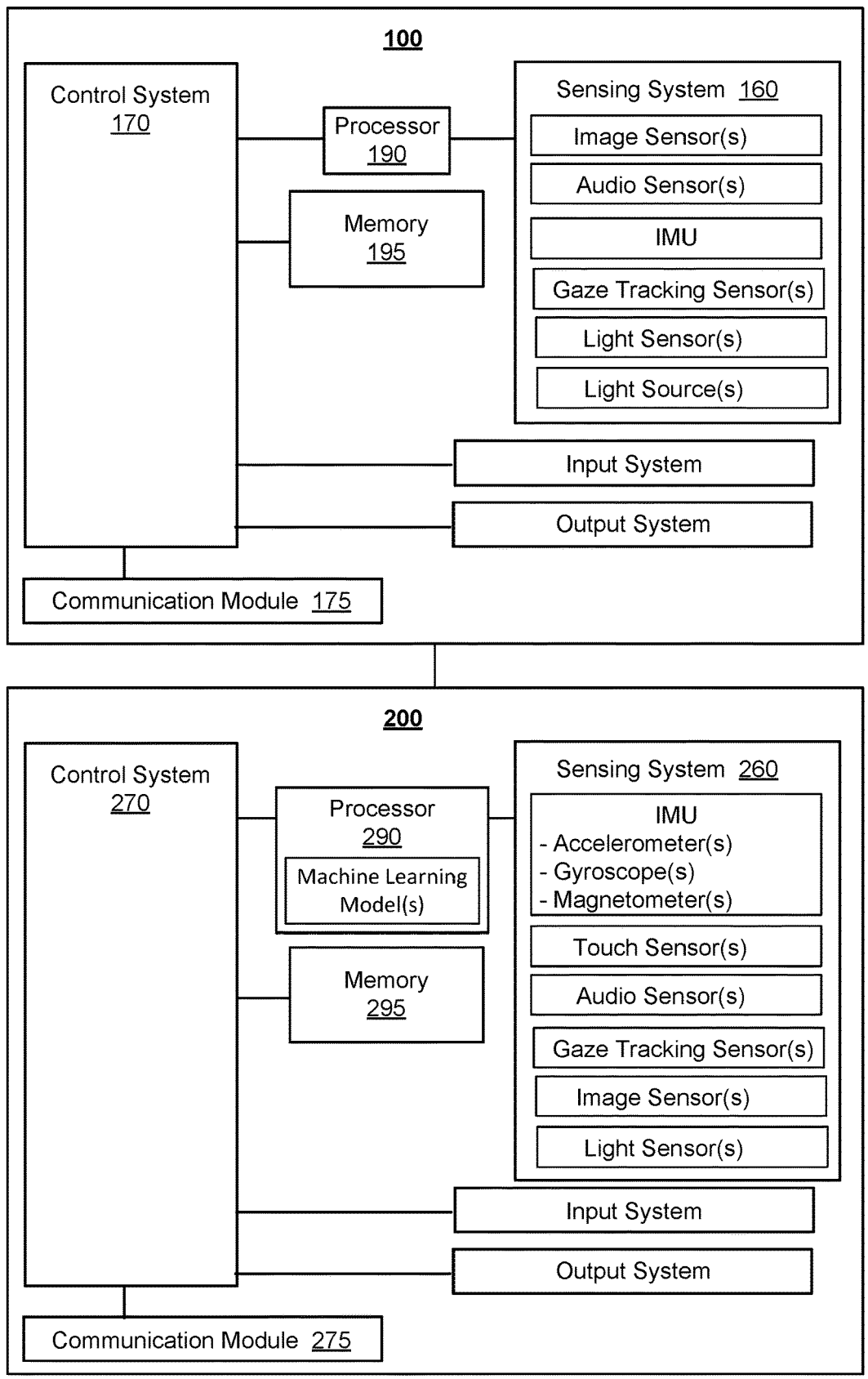
FIG. 3 is a block diagram of an example system configured to implement the concepts described herein.

FIG. 3 is a block diagram of an example system, in accordance with implementations described herein, in which the first computing device 100 is in communication with the second computing device 200. In the example arrangement shown in FIG. 3, the first computing device 100 may be in the form of the example head mounted wearable device, or smart glasses, described above, that can display virtual content to the user. The first computing device 100 is in communication with the second, auxiliary computing device 200, such as the smart phone shown in FIG. 1, that is external to the first computing device 100, and that can display virtual content and/or output audio content. The second computing device 200 can facilitate user interaction with virtual content displayed by the first computing device 100, share content with the first computing device and the like. The first computing device 100 and the second computing device 200 may communicate to exchange information. For example, the first computing device 100 and the second computing device 200 may be operably coupled, to facilitate communication via, for example, a wired connection, a wireless connection via for example, Wi-Fi or Bluetooth, or other type of connection The first computing device 100 includes the sensing system 160 and the control system 170. The sensing system 160 may include numerous different types of sensors, including, for example, the image sensor 180, or camera 180, the audio sensor 140, or microphone 140, position and/or orientation sensors such as, for example, an accelerometer, a gyroscope, a magnetometer and other such sensors included in an inertial measurement unit (IMU) and the like, as well as other sensors and/or different combination(s) of sensors. The control system 170 may include numerous different types of devices, including, for example, a power/pause control device, image and audio control devices, as well as other such devices and/or different combination(s) of devices. The control system 170 may control various input system devices including, for example, audio signals detected by the audio sensor, touch inputs, gesture inputs detected by the image sensor 180, gaze inputs detected by gaze tracking sensors, and other such inputs, for processing by the processor 190. The control system 170 may control various output system devices, including, for example, the display device 120 for output of image content, the audio output device 130 for output of audio content, and the like. In some implementations, the sensing system 160 and/or the control system 170 may include more, or fewer, devices, depending on a particular implementation.

The processor 190 may be in communication with the sensing system 160 and the control system 170. A memory 195 may be accessible by, for example, a module of the control system 170, and a communication module 175 may provide for communication between the first computing device 100 and another, external device, such as, for example, the second computing device 200. The control system 170 may control overall operation of the first computing device 100, including operation of audio and/or video output components of the first computing device 100 in response to inputs received via, for example, control devices of the control system 170 as described above, and/or inputs received from the second computing device 200 via the communication module 175.

The second computing device 200 may include a communication module 275 providing for communication between the second computing device 200 and another, external device, such as, for example, the first computing device 100 operably coupled to or paired with the second computing device 200. The sensing system 260 including a plurality of different sensors. For example, the sensing system 260 may include a touch sensor implemented in the touch input portion 225 of the interface device 210, the audio sensor 240, the image sensor 280, or camera 280 and other types of light sensors. In some implementations, the sensing system 260 may include an IMU, the IMU including, for example, an accelerometer, a gyroscope, a magnetometer, and the like. In some implementations, the sensing system 260 may include other sensors and/or different combination(s) of sensors. The processor 290 may be in communication with the sensing system 260 and the control system 270, the control system 270 accessing a memory 295 and controlling overall operation of the second computing device 200. The control system 270 may control various input system devices including, for example, audio signals detected by the audio sensor 240, touch inputs detected at the touch input portion 225, gesture inputs detected by the IMU, and other such inputs, for processing by the processor 290. The control system 270 may control various output system devices, including, for example, the interface device 210 for output of image content, the audio output device 230 for output of audio content, and the like. In some implementations, the sensing system 260 and/or the control system 270 may include more, or fewer, devices, depending on a particular implementation.

In an augmented reality (AR) environment and/or a mixed reality (MR) environment and/or a virtual reality (VR) environment, the first computing device 100 (i.e., the example head mounted wearable device 100) may be operably coupled with the second computing device 200 (i.e., the handheld device) so that the user can interact with virtual content presented to the user by the first computing device 100 using the second computing device 200, can share content between the first and second computing devices 100, 200, can transfer the execution of content, or cast content, from the first computing device 100 to the second computing device 200, and the like.

Hereinafter, simply for ease of discussion and illustration, a system and method, in accordance with implementations described herein, will be described with respect to an AR environment, in which a head mounted wearable computing device in the form of smart glasses is operably coupled with an external/auxiliary computing device in the form of a smart phone, for interaction with virtual content presented by the smart glasses in the AR environment. The concepts to be described in this manner are applicable to virtual reality (VR) environments and mixed reality (MR) environments, and/or with other combination(s) of computing device(s) in use for presentation of and interaction with virtual content, sharing of content and the like.

FIGS. 4A-4F illustrate the detection and/or identification of an intention to transfer of the execution of content, or casting of content, from a first user device to a second user device, and to perform the intended transfer or casting with little to no user intervention, in accordance with implementations described herein. In this example, the first user device and the second user device are operating within a shared system, or shared ecosystem, thus facilitating communication between the first and second user devices. In this example, the transfer of execution of content, or the casting of content, between devices may refer to a situation in which the output of content to the user on one of the first device or the second device may instead be output by the other of the first device or the second device. In some examples, when the output of content by, for example the first device is to be transferred to the second device, the content may be output only by the second device after the transfer or casting is executed. That is, in contrast to mirroring, in which output is duplicated by devices, the transfer of the execution of the content, or the casting of the content, for example from the first device to the second device may make the first device available for the output of other/additional content. In some examples, the first and second devices may operate in a split compute environment, in which the output of content is transferred, or the content is cast, from the first device to the second device, processing may be split, or shared by the first and second devices, processing may be performed by only the first device, or only the second device. In the example shown in FIGS. 4A-4F, the user device(s) refers to a device, or devices, in use by the user for accessing content, and for transferring execution of content, or casting content from the first user device to the second user device. In the example to be described with respect to FIGS. 4A-4F, the first user device will be a head mounted wearable device in the form of a pair of smart glasses, and the second user device will be an auxiliary, or external user device in the form of a smart phone, simply for purposes of discussion and illustration. The principles to be described may be applied to other devices and/or combinations of devices functioning as user devices, and other devices and/or combinations of devices functioning as auxiliary/external user devices.

In example arrangement to be described with respect to FIGS. 4A-4F, the first user device may be a device that provides somewhat constrained level of display capability, and/or that provides a somewhat constrained user interface or user interaction capability. In the example arrangement to be described with respect to FIGS. 4A-4F, the second user device may be in communication with, or paired with, or operating within the same ecosystem as, the first user device, and may provide an expanded display capability and/or an expanded user interface and/or interaction capability compared to the first user device. Thus, the transfer of content from the first user device to the second user device may allow the user to access additional information and/or interact with the content initially presented by the first user device, which may otherwise be difficult to do given the somewhat constrained capabilities of the first user device. This may enhance the utility and functionality of the first user device, and the related system of devices, and improve the user experience.

Figure 4A:
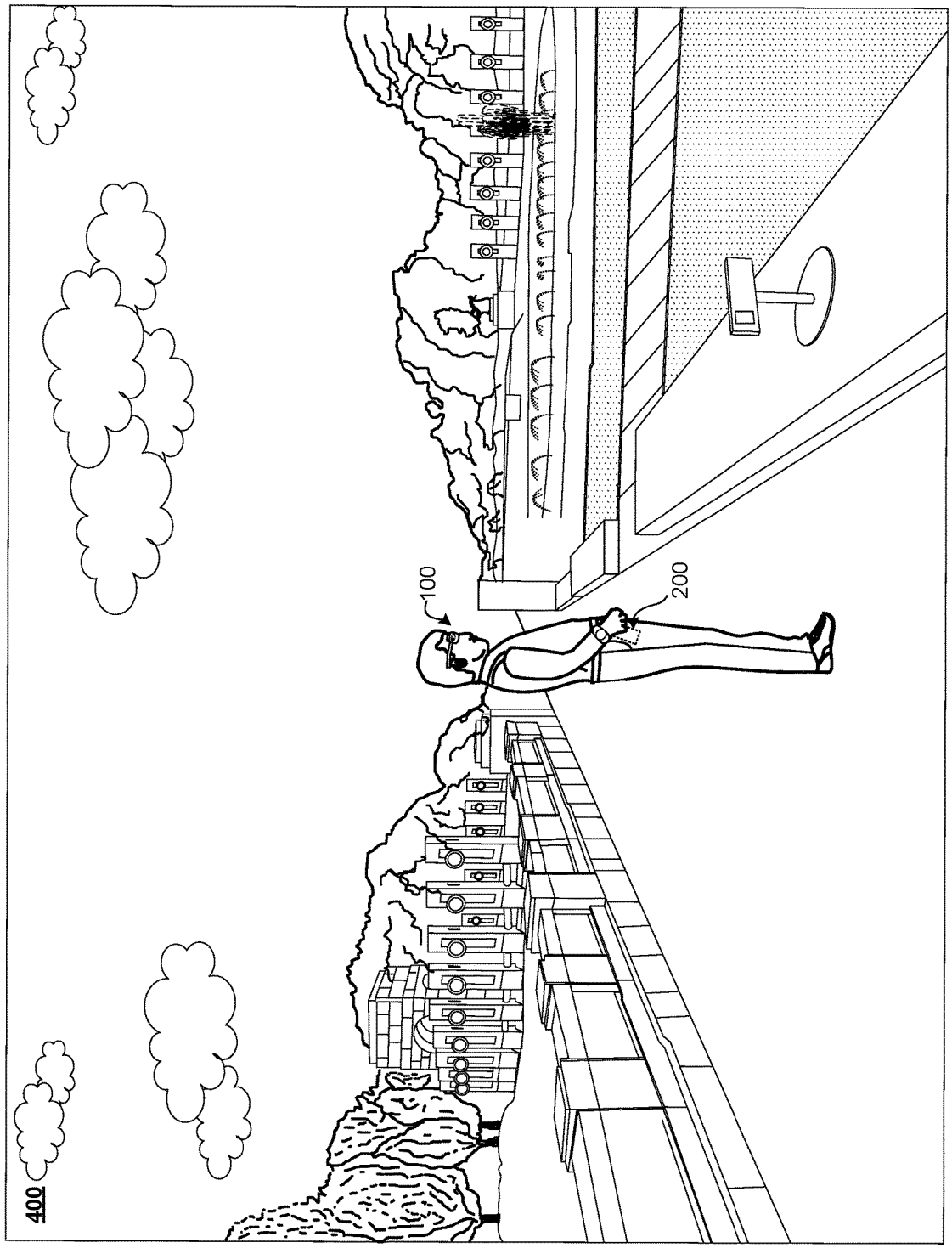
Figure 4B:
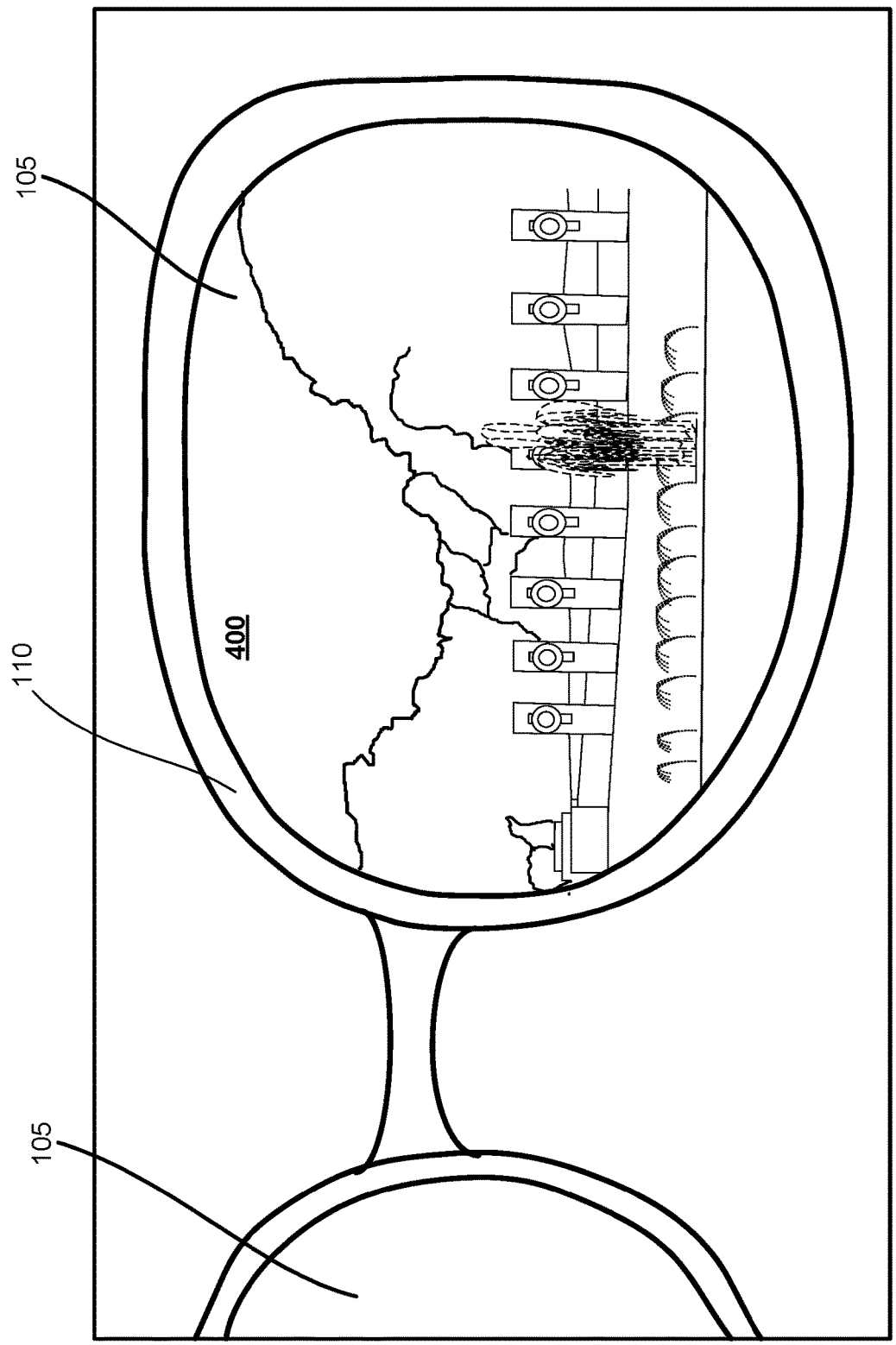
Figure 4C:
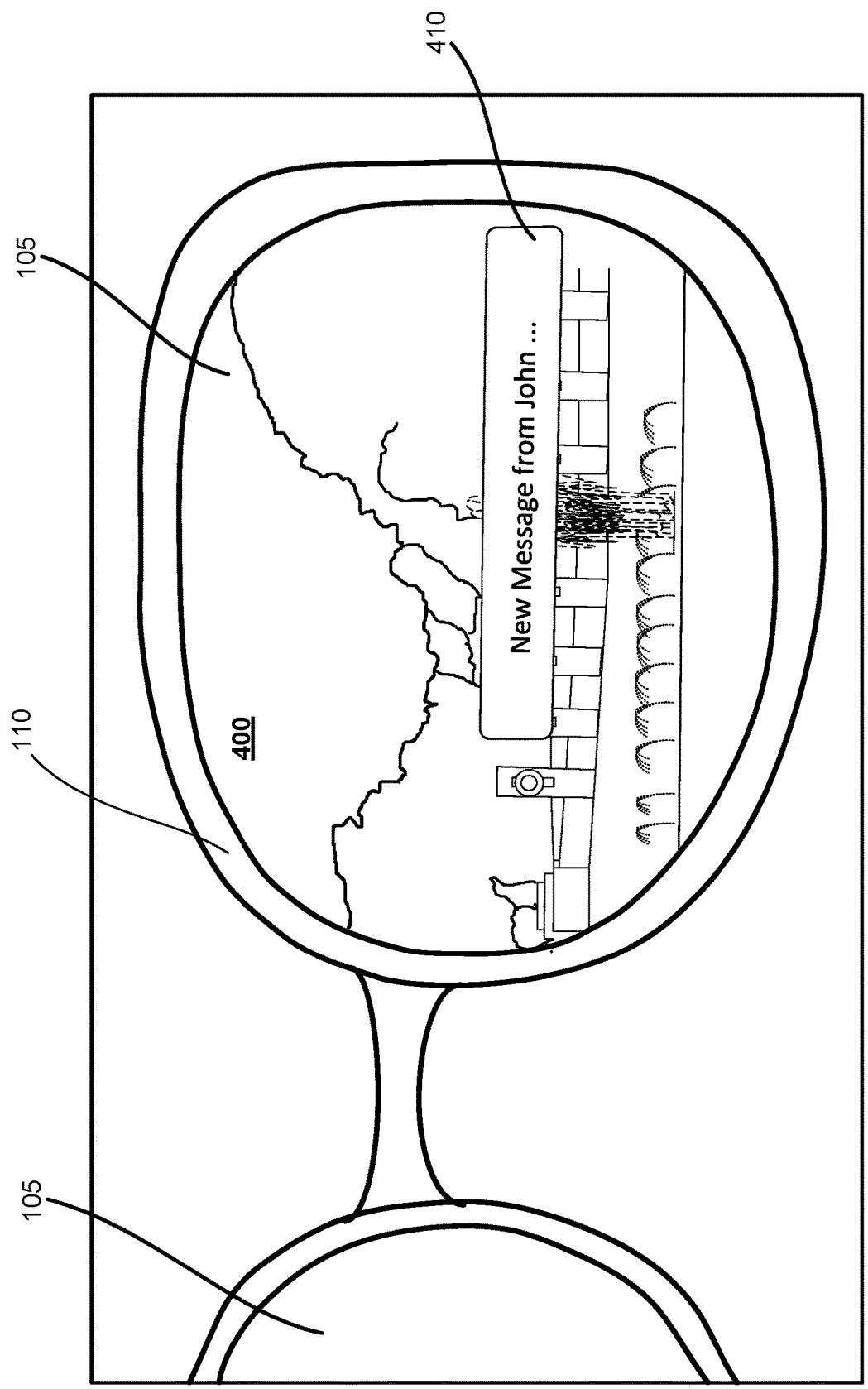

FIG. 4A is a third person view of a user in an ambient environment 400, wearing the first computing device in the form of the head mounted wearable device 100 as described above. The head mounted wearable device 100 may be operably coupled with, or paired with, the second, external or auxiliary computing device 200 in the form of the smart phone 200 as described above. In the example shown in FIG. 4A, the smart phone 200 is in the pocket of the user, and is not actively engaged directly with the smart phone 200. FIG. 4B is a third person view of the user's view of the ambient environment 400 through one of the lenses 105 of the head mounted wearable device 100. In FIG. 4C, a notification 410 is output by the display device 120 of the head mounted wearable device 100, indicating that an incoming message has been received. Due to the somewhat limited amount of display area available to the user on the head mounted wearable device 100, the user may wish to view and/or respond to the incoming message using an external, or auxiliary device having a larger display area and/or a more easily manipulated user interface for composing and sending a response. In this example arrangement, the user may choose to transfer execution of this function, or cast, this content to the smart phone 200 for further interaction. In a system and method, in accordance with implementations described herein, this transfer of execution, or casting, of content, for further interaction, may be accomplished in response to one or more detected conditions which are indicative of the user's intention to transfer the execution of this content, or cast this content, from the head mounted wearable device 100 to the smart phone 200, with little to no user intervention beyond a relatively natural or ordinary action associated with initiating use of and/or engagement with the smart phone 200.

Figure 4D:
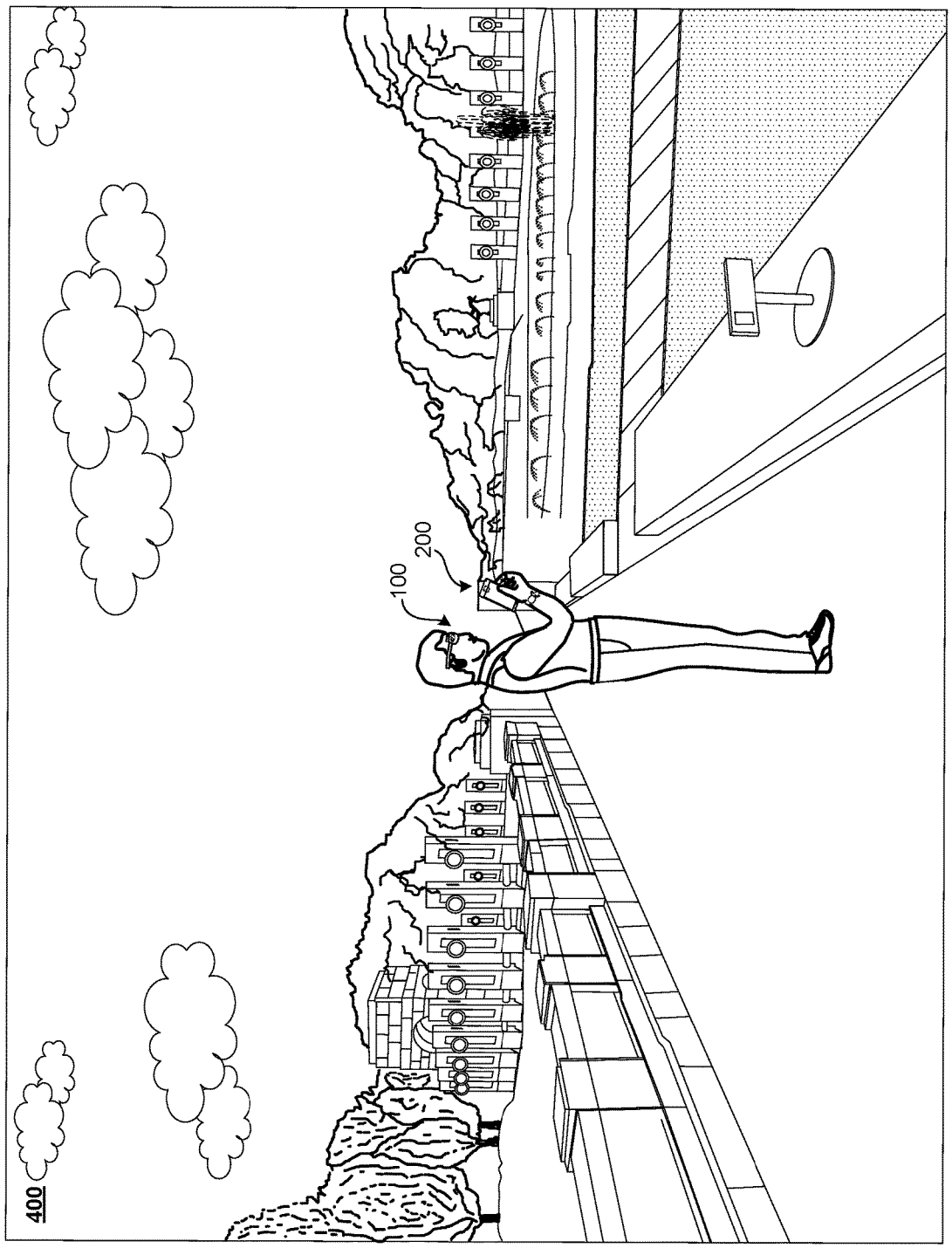
Figure 4F:
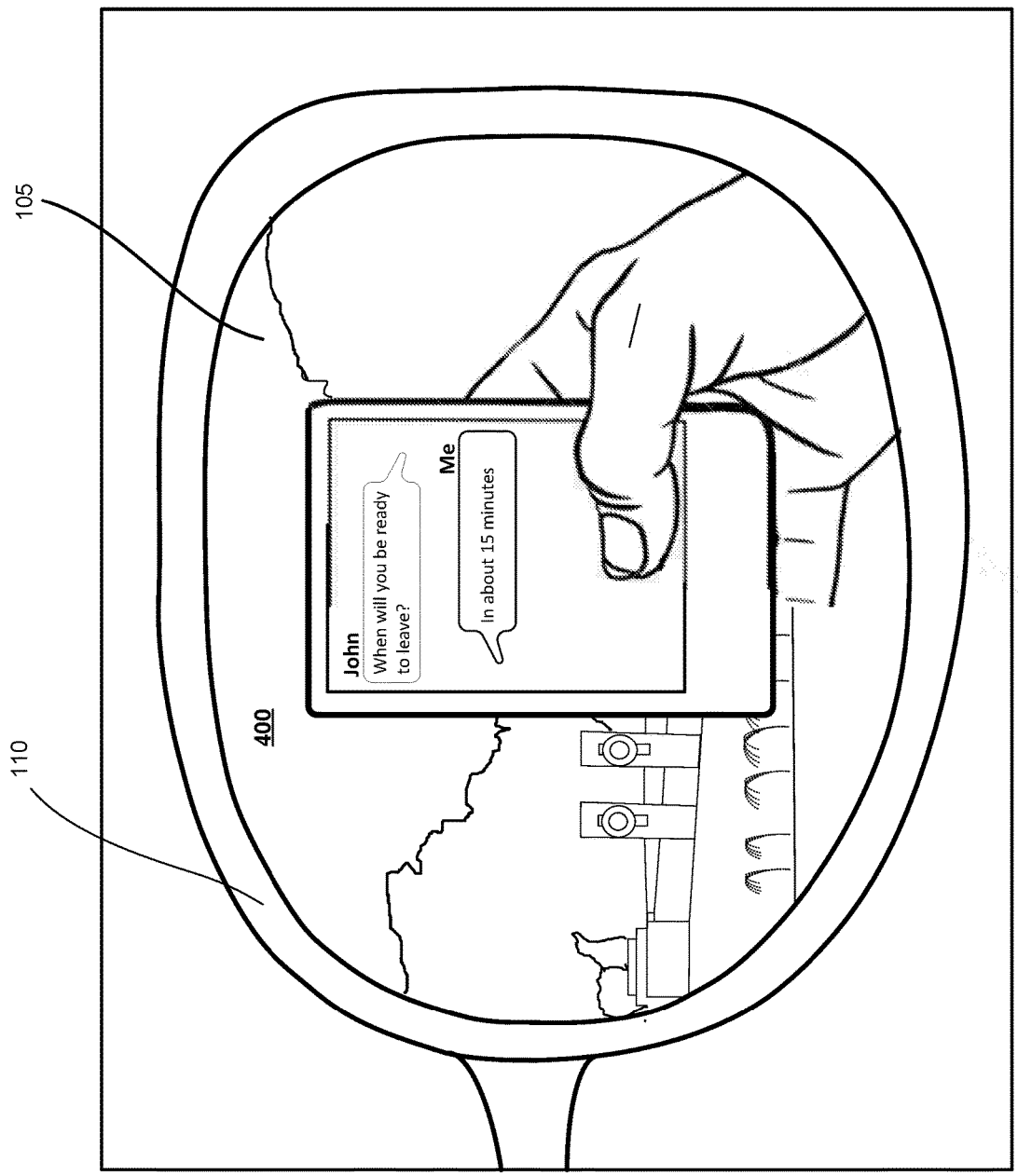

As shown in FIGS. 4D and 4E, in response to the notification 410 of the new incoming message, the user has removed the smart phone 200 from their pocket, and lifted the smart phone 200 so that the interface device 210 is within the field of view of the user. In particular, detection of the lifting motion of the smart phone 200, and detection of the smart phone 200 within the field of view of the user, and within the field of view of the camera 180 of the head mounted wearable device 100, may be interpreted as a user intention to transfer the execution of the displayed content to the smart phone 200, or cast from the head mounted wearable device 100 to the smart phone 200. Once the execution of content has been transferred, or cast to the smart phone 200, the user can use the smart phone 200 to access additional information related to the displayed content (in this example, the notification 410 of a new message), and to further interact with the content, as shown in FIG. 4F. In this example, transfer, or casting from the head mounted wearable device 100 to the smart phone 200 allows the user to view the content of the new message (for example, via the display portion 220 of the interface device 210 of the smart phone 200). This also allows the user to respond to the new message (for example, via the touch input portion 225 of the interface device 210 of the smart phone 200).

In the example described above with respect to FIGS. 4A-4F, the transfer of execution of content, or casting of content, from the head mounted wearable device 100 to the smart phone 200 is triggered in response to the detection of a lift event together with an identification event, including detection of the lift of the smart phone 200 and also the detection of the smart phone 200 within the field of view of the camera 180 of the head mounted wearable device 100. The detected lift event (i.e., the detected lifting of the smart phone 200) may be a first triggering condition to be met (e.g., satisfied) in the triggering of the transfer of execution of content, or casting of content as described. The detected identification event (i.e., detection of the smart phone 200 within the field of view of the camera 180 of the head mounted wearable device 100) may be a second triggering condition to be met in the triggering of the transfer of execution of content, or casting of content as described. In some implementations, the transfer of the execution of content from the head mounted wearable device 100 to the smart phone 200 relies on meeting or satisfying both the first triggering condition and the second triggering condition. Meeting or satisfying both the first triggering condition and the second triggering condition may provide a reliable level of assurance or accuracy in determining that it is the intent of the user to transfer of execution of current content, or cast current content, from the head mounted wearable device 100 to the smart phone 200.

In some examples, detection of the lifting of the smart phone 200 may rely on, for example, signals from one or more of the sensors of the smart phone 200. For example, based on signals provided by the IMU and/or accelerometer and/or gyroscope and/or magnetometer of the smart phone 200, the control system 270 and/or the processor 290 may determine that a lift event, i.e., a lift of the smart phone 200, has been detected. In some implementations, the lift event may be detected when a detected movement of the smart phone 200 is greater than or equal to a set threshold and/or within a set range of directions from an initiation point of the detected movement. In some examples, detection of the identification event, i.e., detection of the smart phone 200 within the field of view of the camera 180 of the head mounted wearable device 100, may rely on signals, for example, image signals captured by the camera 180, and identified by the processor 190 of the head mounted wearable device 100 and/or the processor 290 of the smart phone 200. Images captured by the camera 180 may be matched with known and/or previously stored images of the smart phone 200 (for example, stored in the memory 195 of the head mounted wearable device 100 and/or the memory 295 of the smart phone 200) to identify the smart phone 200 in the images captured by the camera 180. Thus, detection of the lift event may satisfy the first triggering condition, and detection of the identification event may satisfy the second triggering condition.

In some situations, there may be a delay between the detection of the lift of the smart phone 200 and the detection of the smart phone 200 within the field of view of the camera 180 of the head mounted wearable device 100. In some implementations, the detection of the lift event may be stored, for example, in the memory 295 of the smart phone 200, or cached, for a set amount or period of time, to allow for the detection of the smart phone 200 within the field of view of the camera 180 of the head mounted wearable device 100 within the set amount or period of time. With the temporal smoothing provided by the automatically expiring cache, the user intent to transfer the execution of content, or cast content, may be reliably and/or accurately detected based on the detection of the satisfaction of both the first and second triggering conditions, while taking into account the delay between the detection of the satisfaction of the first triggering condition and the second triggering condition. In some examples, in the prediction and/or detection of the movement of the smart phone 200, one or more machine learning models may be accessible to the processor 290. The one or more machine learning models may synthesize data provided by one or more sensors, for example, accelerometer(s), gyroscope(s), magnetometer(s) and the like of the sensing system 260 to detect and/or predict the movement of the smart phone 200, and to further improve the detection and/or prediction of this movement.

In response to the detection of the satisfaction of both the first triggering condition and the second triggering condition, content output by the head mounted wearable device 100 may be transferred for execution on the smart phone 200, or cast to the smart phone 200. This may allow the user to access additional information, more fully interact with the content, view the content on a larger display device, and the like. The satisfaction of both the first triggering condition and the second triggering condition may serve as a user input that ensures with a relatively high degree of accuracy the user intent to transfer the execution of the content output by the head mounted wearable device 100 to the smart phone 200. However, as the lifting of the smart phone 200 to a position within the field of view of the user, and thus also within the field of view of the camera 180 of the head mounted wearable device 100, is a natural, easily executed user input or gesture that is indicative of the desire or intent of the user to view and/or use and/or interact with content output by the smart phone 200. Thus, this type of user input may be easily executed and detected, without any additional input from the user outside what would otherwise be done to view the smart phone 200. As the head mounted wearable device 100 and the smart phone 200 are operably coupled, or paired, and share processing responsibilities, the transfer of content, or casting as described can be readily accomplished in response to the satisfaction of both the first triggering condition and the second triggering condition.

In some examples, the detection of the lift of the smart phone 200 based on signals from the one or more sensors, such as the IMU of the smart phone 200 in advance of the detection of the smart phone 200 within the field of view of the camera 180 of the head mounted wearable device 100 may provide for more efficient power and processing utilization within the system. In many situations, modeling within the IMU may be relatively smaller, and thus less power and/or computationally intensive than screen detection models associated with the detection of the smart phone 200 within the field of view of the camera 180 of the head mounted wearable device 100. Thus, in some examples, the relatively larger and relatively higher latency screen detection models may be gated, and only be run, in a situation in which the lift has been detected, thus preserving power over time.

In the example described above with respect to FIGS. 4A-4F, the new incoming message was received on the smart phone 200, and the new message notification 410 was output to the user by the display device 120 of the head mounted wearable device 100 due to the transfer of information, or shared or split computing enabled by the pairing or operable coupling of the head mounted wearable device 100 and the smart phone 200, the known/shared identifier associated with the incoming new message, and the awareness between the head mounted wearable device 100 and the smart phone 200. FIGS. 5A-5E illustrate an example in which a command, or a request for information, is received or detected by the head mounted wearable device 100, and is executed by the smart phone 200 after the first and second triggering conditions are met.

Figure 5A:
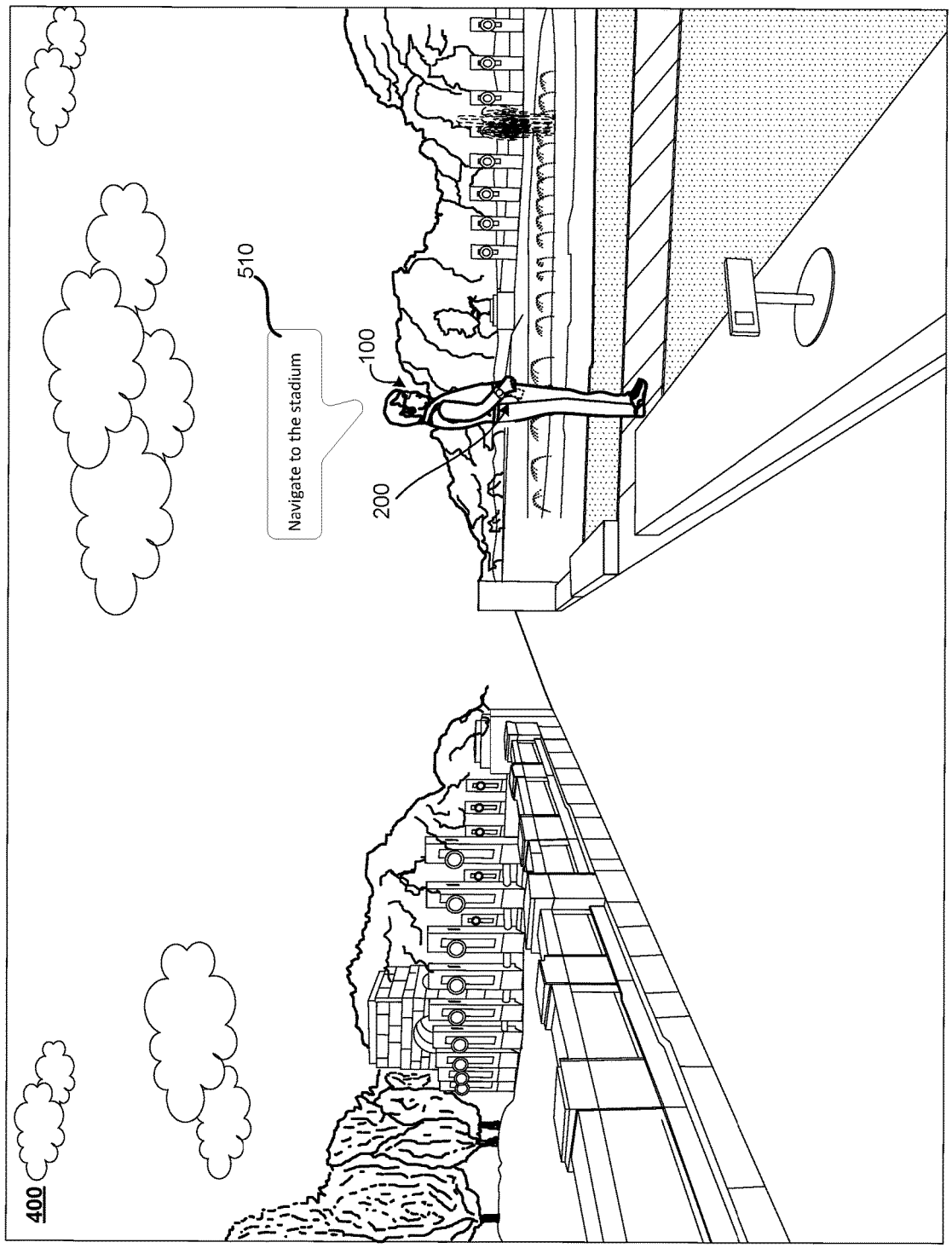
FIGS. 5A-5E illustrate the execution of content on a second user device in response to a command received at a first user device, in accordance with implementations described herein.
Figure 5B:
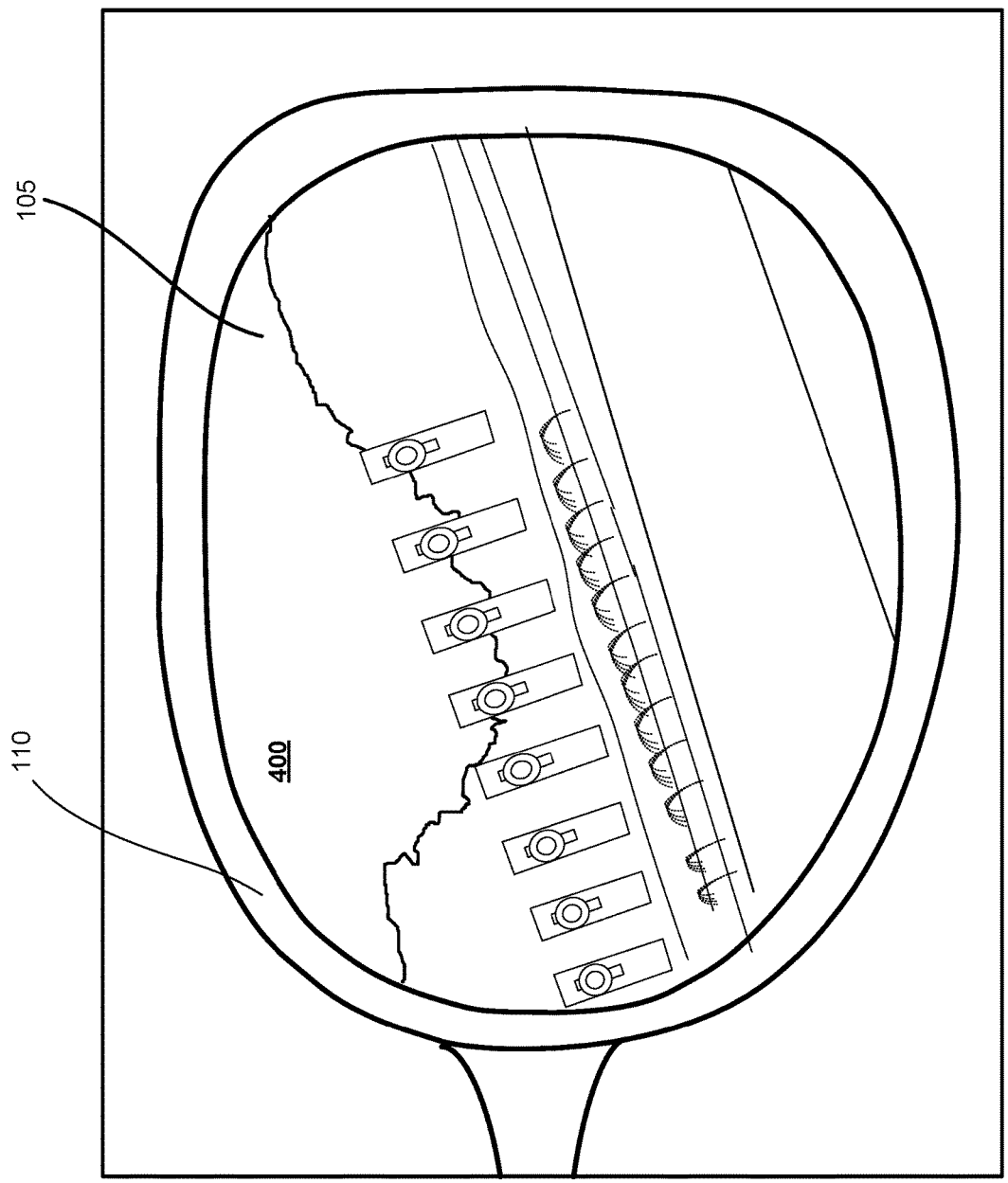

FIG. 5A is a third person view of the user in the ambient environment 400. In the example shown in FIG. 5A, the user has output an audible inquiry, or command 510. The audible inquiry, or audible command 510 may be detected by, for example, the audio sensor 140, or microphone 140 of the head mounted wearable device 100 and/or the audio sensor 240, or microphone 240 of the smart phone 200. The detected audible command 510 may be processed by the processor 190 of the head mounted wearable device 100 and/or the processor 290 of the smart phone 200 to execute the command 510. FIG. 5B is a third person view of the user's view of the ambient environment 400 through one of the lenses 105 of the head mounted wearable device 100 as the audible command 510 is issued.

Figure 5C:
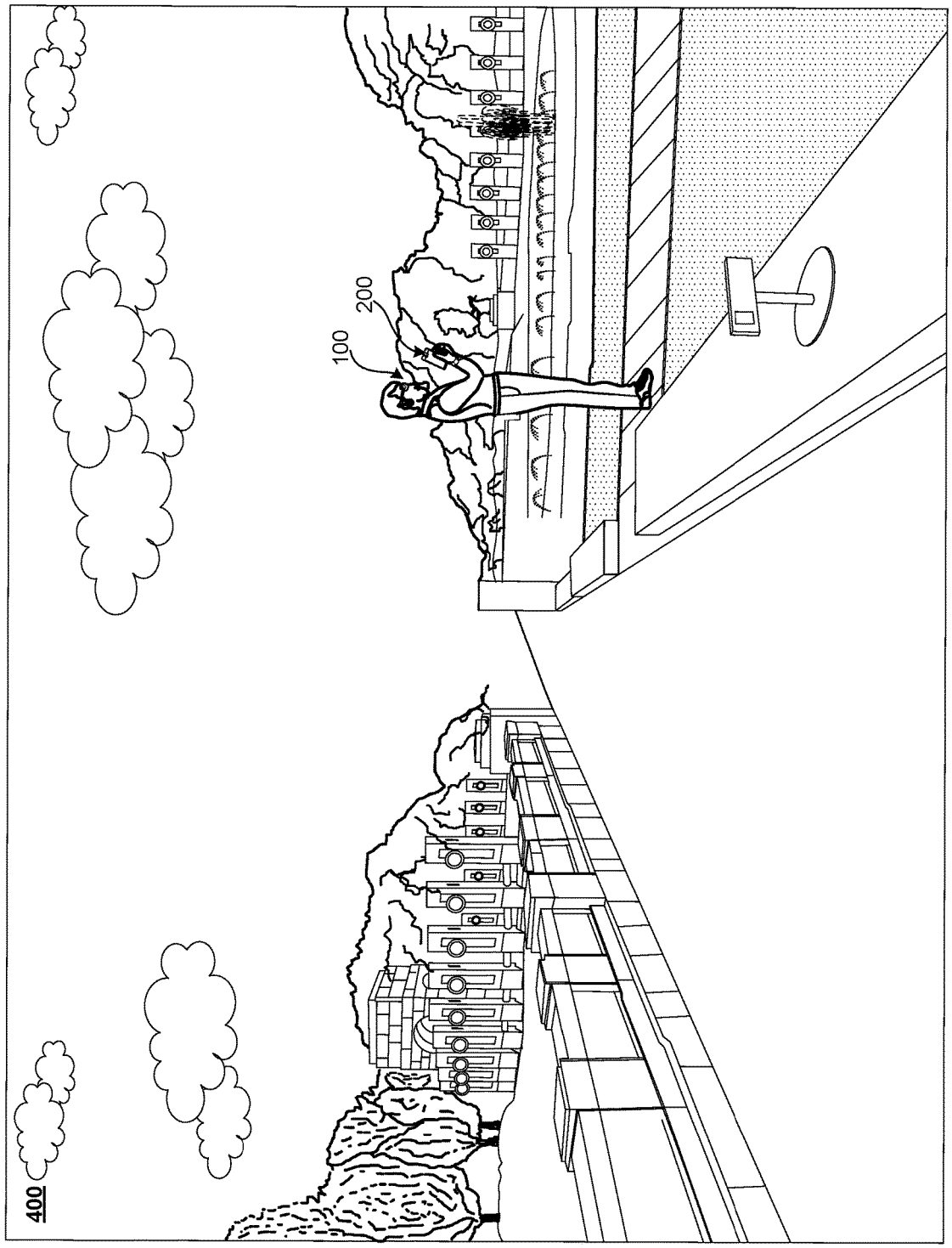
Figure 5D:
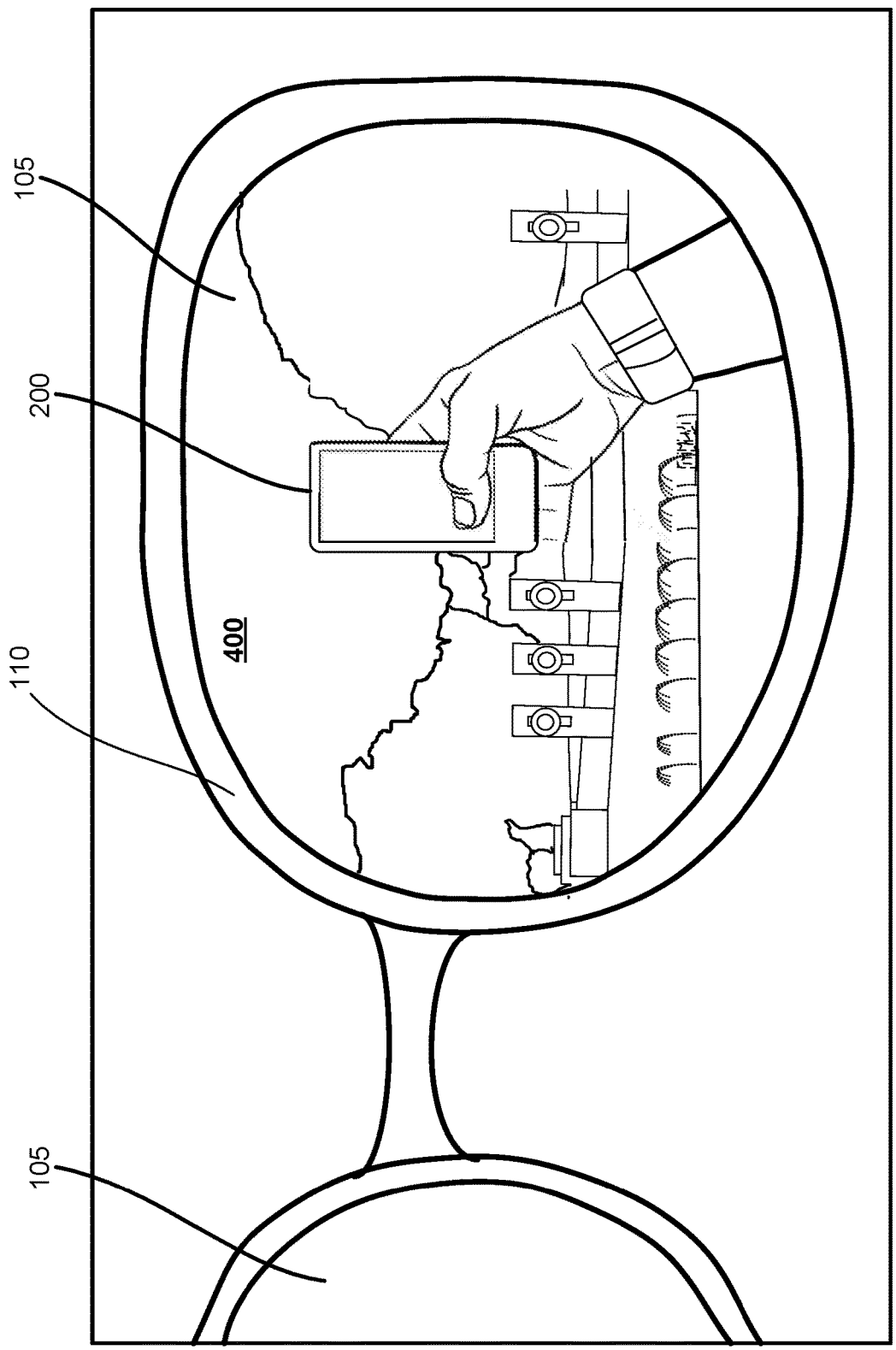
Figure 5E:
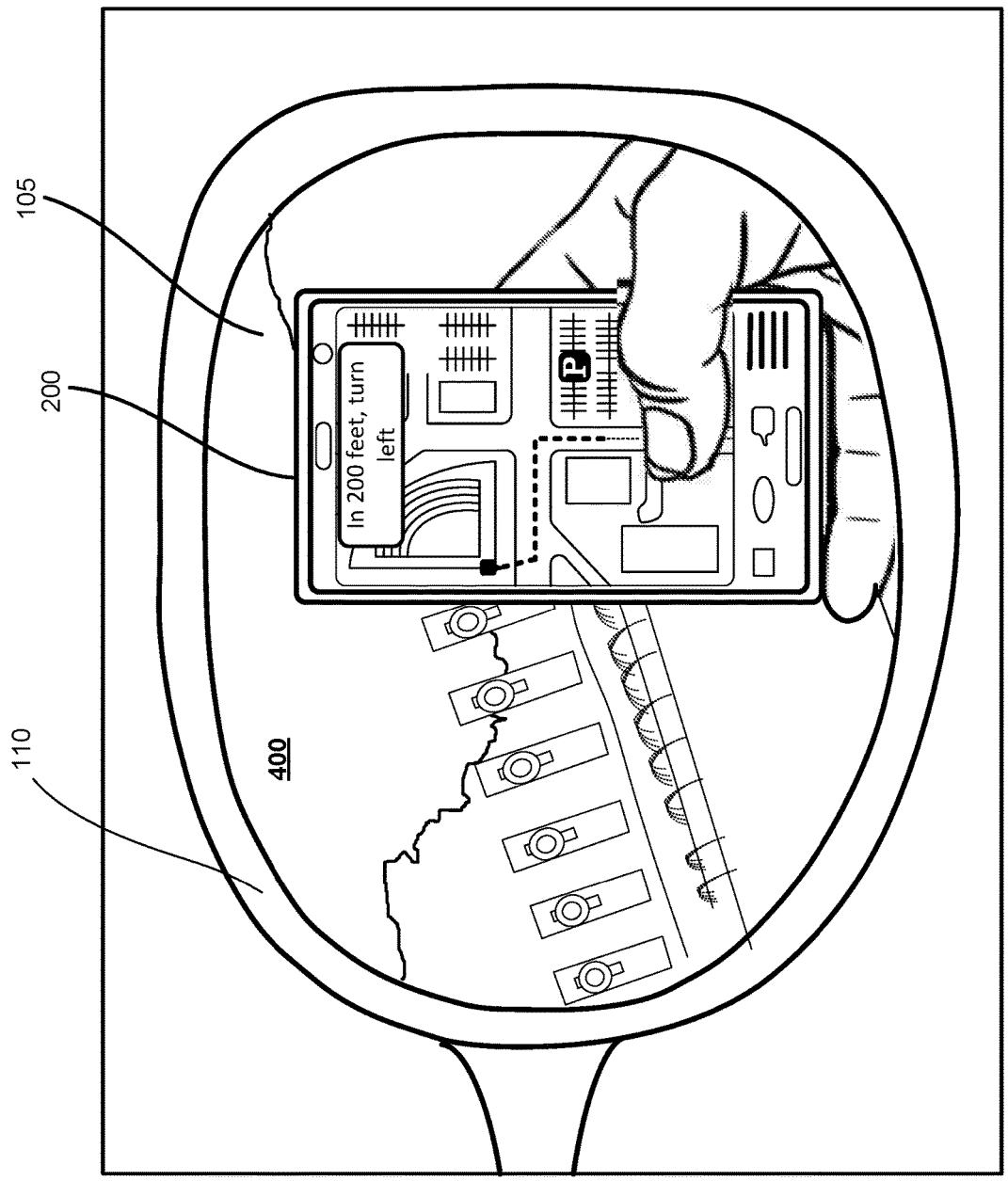

As shown in FIGS. 5C and 5D, concurrent with or after issuing the audible command 510, the user has removed the smart phone 200 from their pocket, and lifted the smart phone 200 so that the interface device 210 is within the field of view of the user. In particular, detection of the lifting motion of the smart phone 200, and detection of the smart phone 200 within the field of view of the user, and within the field of view of the camera 180 of the head mounted wearable device 100, may be interpreted as a user intention to transfer the execution content to be displayed to the smart phone 200, or cast content to be displayed to the smart phone 200. In response to the audible command, the detected lift of the smart phone 200 as described above, and the detection of the smart phone 200 to a position within the field of view of the camera 180 of the head mounted wearable device as described above, the first and second triggering conditions have been met, or satisfied. In response to the determination that both the first and second triggering conditions have been satisfied, the content may be executed on the smart phone 200, as shown in FIG. 5E.

Execution of content on the smart phone 200 in response to the detected lift event (i.e., the detected lift of the smart phone 200) and the identification event (i.e., the detection of the smart phone 200 in the field of view of the camera 180 of the head mounted wearable device 100), the content may be executed on, or cast to the smart phone 200. Execution of the content on the smart phone 200 having a greater display area and/or a more extensive user interface may allow the user to access additional information related to the displayed content, and to further interact with the content, as shown in FIG. 5E. In this example, transfer, or casting of the content to the smart phone 200 allows the user to view a detailed map, walking directions and other such information (for example, via the display portion 220 of the interface device 210 of the smart phone 200). This also allows the user to adapt or change a destination, search along the navigation route, access information related to landmarks along the route, and the like (for example, via the touch input portion 225 of the interface device 210 of the smart phone 200).

In the example described above with respect to FIGS. 4A-4F, the transfer of execution of content, or casting of content, from the head mounted wearable device 100 to the smart phone 200 is triggered in response to the detection of a lift event together with an identification event, including detection of the lift of the smart phone 200 and also the detection of the smart phone 200 within the field of view of the camera 180 of the head mounted wearable device 100. The detected lift event (i.e., the detected lifting of the smart phone 200) may be a first triggering condition to be met in the triggering of the transfer of execution of content, or casting of content as described. The detected identification event (i.e., detection of the smart phone 200 within the field of view of the camera 180 of the head mounted wearable device 100) may be a second triggering condition to be met in the triggering of the transfer of execution of content, or casting of content as described. In some implementations, the transfer of the execution of content from the head mounted wearable device 100 to the smart phone 200 relies on meeting or satisfying both the first triggering condition and the second triggering condition. Meeting or satisfying both the first triggering condition and the second triggering condition may provide a reliable level of assurance or accuracy in determining that it is the intent of the user to transfer of execution of current content, or cast current content, from the head mounted wearable device 100 to the smart phone 200.

The examples shown in FIGS. 4A-4F and 5A-5E include a user wearing the head mounted wearable device 100 in the form of smart glasses, interacting with an auxiliary device in the form of a smart phone 200 for which a lift event can be detected based on signal(s) provided by one or more sensors of the smart phone 200, and an identification event can be detected based on an image captured by the camera 180 of the head mounted wearable device 100. In the examples shown in FIGS. 4A-4F, the lift event is detected as the user removes the smart phone 200 from their pocket, simply for purposes of discussion and illustration. In some examples, the auxiliary device may include other types of computing devices such as, for example a tablet computing device. In some examples, the lift event may be detected when the auxiliary device (for example, in the form of a smart phone, a tablet device and the like) is lifted from some other location, such as a work surface, a table and the like, and is brought into position in the field of view of the camera 180 of the head mounted wearable device 100 for identification.

In some examples, the user may already be looking at the smart phone 200 when a notification is to be provided, for example, of a new, incoming message and the like as described above. In this situation, the lift of the smart phone 200, and the detection of the smart phone 200 within the field of view of the camera 180 of the head mounted wearable device 100 may have already been detected, thus satisfying both the first triggering condition and the second triggering condition. Due to the awareness between the head mounted wearable device 100 and the smart phone 200 of the relative positioning, and the user engagement with the smart phone 200, the notification or alert may be displayed to the user on the smart phone 200.

Figure 6:
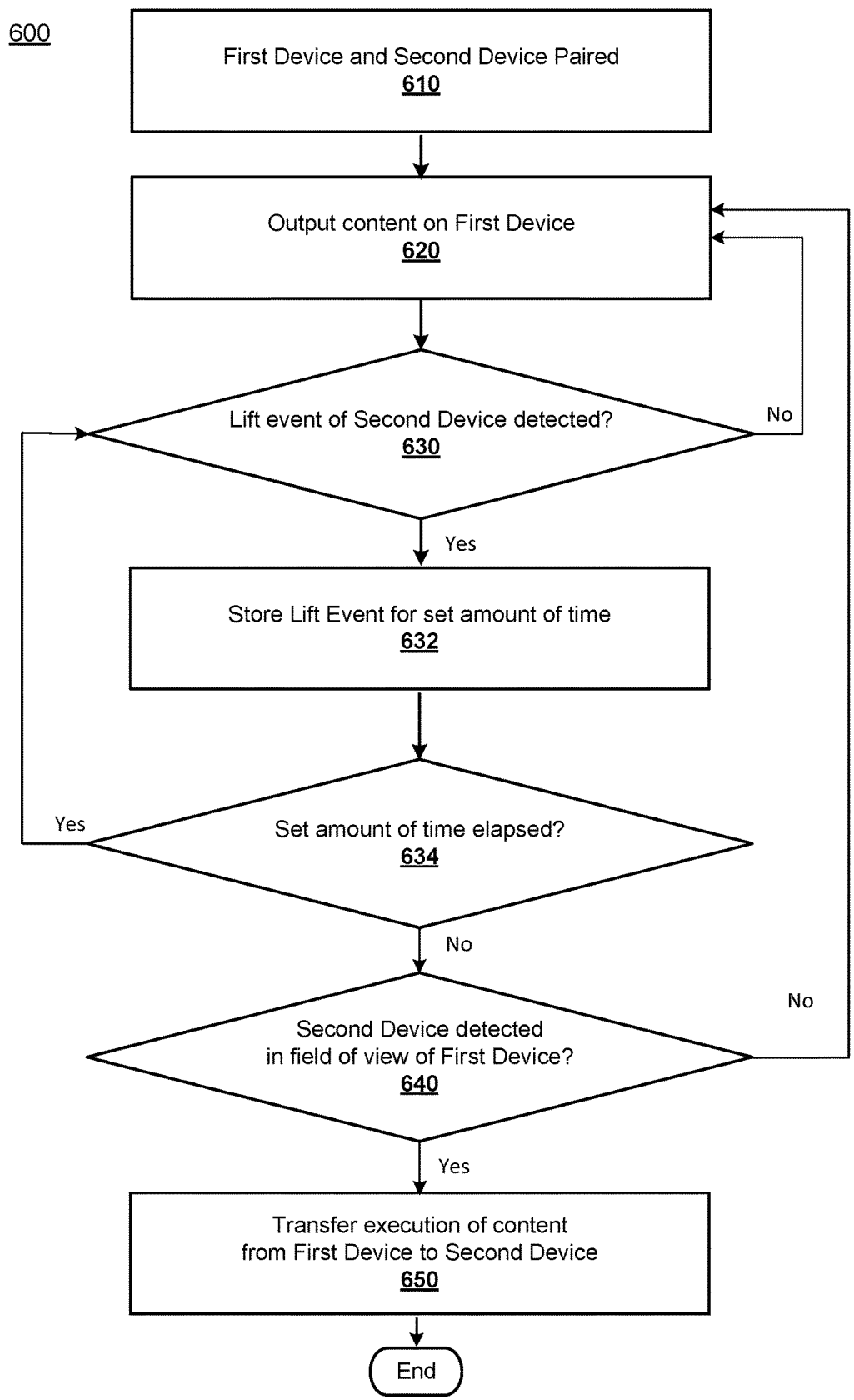
FIG. 6 is a flowchart of an example method, in accordance with implementations described herein.

FIG. 6 is a flowchart of an example method 600 for casting content from a first computing device to a second computing device, in accordance with implementations described herein. The first computing device may be, for example, a head mounted wearable computing device such as the smart glasses described above. The second computing device may be a computing device that is separate from and paired with, or operably coupled with the first computing device. The second computing device may be, for example, a handheld device such as the smart phone described above, a tablet computing device, a laptop computing device, a computer monitor/display, a television, and other such devices.

With the first computing device and the second computing device in a paired, or operably coupled state (Block 610), content may be output by the first computing device. For example, as described above with respect to FIGS. 4A-4C, content may be output or executed by the first computing device, or a command for the output of content may be received by the first computing device as described above with respect to FIG. 5A (block 620). In response to detection of a lift event indicating that movement of the second computing device has been initiated (for example, movement from a stored position) (block 630), and in response to detection of an identification event indicating that the second device has been detected or identified with a field of view of the first computing device (block 640), execution of the content output by the first computing device is transferred to the second computing device (block 650). In some examples, the detection of the lift event (block 630) may be stored, or cached for a set period of time (block 632), pending the detection of the identification event (block 640). The detection of the lift event may expire after the set amount of time (block 634).

Figure 7:
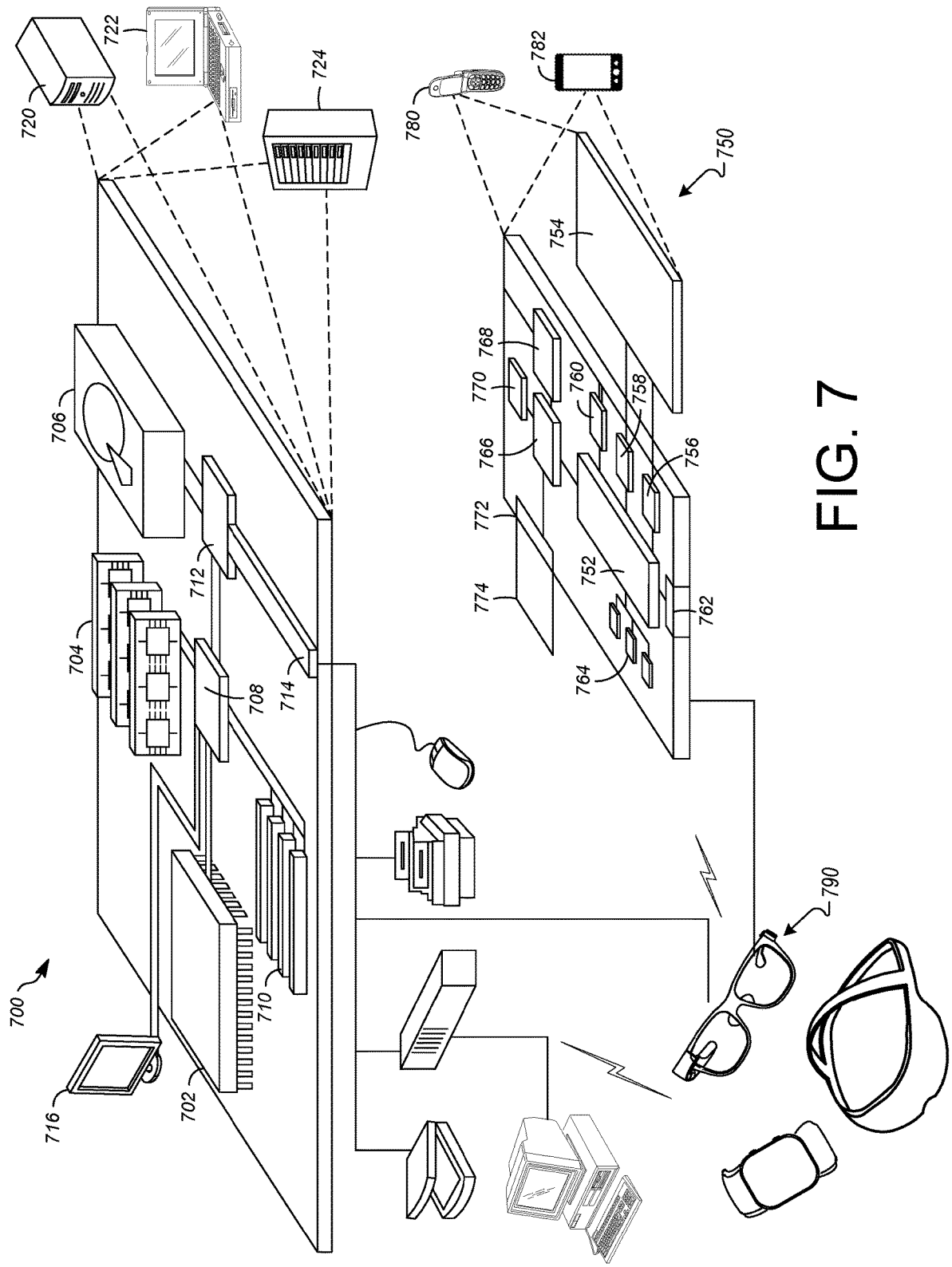
FIG. 7 shows an example of a generic computer device and a generic mobile computer device.

FIG. 7 illustrates an example of a computer device 700 and a mobile computer device 750, which may be used with the techniques described here (e.g., to implement one or more of the example first computing devices and one or more of the second computing devices). The computing device 700 includes a processor 702, memory 704, a storage device 706, a high-speed interface 708 connecting to memory 704 and high-speed expansion ports 710, and a low-speed interface 712 connecting to low-speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high-speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high-speed controller 708 manages bandwidth-intensive operations for the computing device 700, while the low-speed controller 712 manages lower bandwidth-intensive operations. Such allocation of functions is example only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display), and LED (Light Emitting Diode) or an OLED (Organic Light Emitting Diode) display, or other appropriate display technology. The display interface 756 may include appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In-Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, Wi-Fi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in the figure can include sensors that interface with an AR headset/HMD device 790 to generate an augmented environment for viewing inserted content within the physical space. For example, one or more sensors included on a computing device 750 or other computing device depicted in the figure, can provide input to the AR headset 790 or in general, provide input to an AR space. The sensors can include, but are not limited to, a touchscreen, accelerometers, gyroscopes, pressure sensors, biometric sensors, temperature sensors, humidity sensors, and ambient light sensors. The computing device 750 can use the sensors to determine an absolute position and/or a detected rotation of the computing device in the AR space that can then be used as input to the AR space. For example, the computing device 750 may be incorporated into the AR space as a virtual object, such as a controller, a laser pointer, a keyboard, a weapon, etc. Positioning of the computing device/virtual object by the user when incorporated into the AR space can allow the user to position the computing device so as to view the virtual object in certain manners in the AR space. For example, if the virtual object represents a laser pointer, the user can manipulate the computing device as if it were an actual laser pointer. The user can move the computing device left and right, up and down, in a circle, etc., and use the device in a similar fashion to using a laser pointer. In some implementations, the user can aim at a target location using a virtual laser pointer.

In some implementations, one or more input devices included on, or connect to, the computing device 750 can be used as input to the AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 750 when the computing device is incorporated into the AR space can cause a particular action to occur in the AR space.

In some implementations, a touchscreen of the computing device 750 can be rendered as a touchpad in AR space. A user can interact with the touchscreen of the computing device 750. The interactions are rendered, in AR headset 790 for example, as movements on the rendered touchpad in the AR space. The rendered movements can control virtual objects in the AR space.

In some implementations, one or more output devices included on the computing device 750 can provide output and/or feedback to a user of the AR headset 790 in the AR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 750 may appear as another object in a computer-generated, 3D environment. Interactions by the user with the computing device 750 (e.g., rotating, shaking, touching a touchscreen, swiping a finger across a touch screen) can be interpreted as interactions with the object in the AR space. In the example of the laser pointer in an AR space, the computing device 750 appears as a virtual laser pointer in the computer-generated, 3D environment. As the user manipulates the computing device 750, the user in the AR space sees movement of the laser pointer. The user receives feedback from interactions with the computing device 750 in the AR environment on the computing device 750 or on the AR headset 790. The user's interactions with the computing device may be translated to interactions with a user interface generated in the AR environment for a controllable device.

In some implementations, a computing device 750 may include a touchscreen. For example, a user can interact with the touchscreen to interact with a user interface for a controllable device. For example, the touchscreen may include user interface elements such as sliders that can control properties of the controllable device.

Computing device 700 is intended to represent various forms of digital computers and devices, including, but not limited to laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be examples only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A non-transitory computer-readable medium storing executable instructions that, when executed by at least one processor of a computing device, cause the at least one processor to:
    detect that a first triggering condition has been met, the first triggering condition corresponding to a movement of a mobile computing device toward a head mounted computing device paired with the mobile computing device;
    detect that a second triggering condition has been met, the second triggering condition corresponding to a detection of the mobile computing device within a field of view of an image sensor of the head mounted computing device;
    transfer output of content, being output on the head mounted computing device, to the mobile computing device in response to the first triggering condition and the second triggering condition being met;
    output the content on the mobile computing device; and
    provide expanded access to additional information related to the content via a user interface device of the mobile computing device, the expanded access to the additional information being previously inaccessible via the output of the content on the head mounted computing device.

2. The non-transitory computer-readable medium of claim 1, wherein the executable instructions cause the at least one processor to transfer the output of the content from the head mounted computing device to the mobile computing device in response to determining that the second triggering condition has been met within a period of time of determining that the first triggering condition has been met.

3. The non-transitory computer-readable medium of claim 1, wherein the executable instructions cause the at least one processor to transfer the output of the content, being output on a first display device defining a user interface device of the head mounted computing device, to a second display device defining the user interface device of the mobile computing device.

4. The non-transitory computer-readable medium of claim 1, wherein the executable instructions cause the at least one processor to detect a movement of the mobile computing device from a stored position toward a position within a field of view of a user of the head mounted computing device corresponding to the field of view of the image sensor.

5. The non-transitory computer-readable medium of claim 4, wherein the executable instructions cause the at least one processor to detect the second triggering condition in response to detecting the mobile computing device within an image captured by the image sensor of the head mounted computing device.

6. The non-transitory computer-readable medium of claim 5, wherein the executable instructions cause the at least one processor to store the detection of the first triggering condition for a period of time.

7. The non-transitory computer-readable medium of claim 6, wherein the executable instructions cause the at least one processor to:
    in response to detecting the second triggering condition while the first triggering condition is stored, determine that the output of the content is to be transferred from the head mounted computing device, and to transfer the output of the content to the mobile computing device; and
    in response to detecting the second triggering condition after the period of time has elapsed, determine that the output of the content is to remain with the head mounted computing device.

8. The non-transitory computer-readable medium of claim 1, wherein the executable instructions cause the at least one processor to:
    receive data from at least one of an accelerometer or a gyroscope of the mobile computing device; and
    detect the movement of the mobile computing device based on the data received from the at least one of the accelerometer or the gyroscope.

9. The non-transitory computer-readable medium of claim 8, wherein the executable instructions cause the at least one processor to update a machine learning model of the movement of the mobile computing device based on the data received from the at least one of the accelerometer or the gyroscope of the mobile computing device associated with the first triggering condition in response to a determination that the movement of the mobile computing device is an intentional movement of the mobile computing device into the field of view of the image sensor of the head mounted computing device.

10. The non-transitory computer-readable medium of claim 1, wherein the executable instructions cause the at least one processor to and suspend output of the content on the head mounted computing device in response to transferring the content to the mobile computing device and outputting the content on the mobile computing device.

11. A system, comprising:
a first computing device; and
a second computing device paired with the first computing device, the second computing device including at least one processor and a memory storing instructions that, when executed by the at least one processor, cause the at least one processor to:
 detect initiation of a movement of the second computing device toward the first computing device based on data provided by at least one position sensor of the second computing device; and
 determine that a first triggering condition has been met indicating the movement is intentional, based on a machine learning model modeling movement of the second computing device relative to the first computing device;
 determine that a second triggering condition has been met, the second triggering condition corresponding to a detection of the second computing device within a field of view of an image sensor of the first computing device;
 transfer output of content being output by the first computing device to the second computing device in response to the first triggering condition and the second triggering condition being met;
 output the content on the second computing device; and
 provide expanded access to additional information related to the content via a user interface device of the second computing device, the expanded access to additional information being previously inaccessible via the output of the content on the first computing device.

12. The system of claim 11, wherein the instructions cause the at least one processor to transfer the output of the content from the first computing device to the second computing device in response to determining that the second triggering condition has been met within a period of time of determining that the first triggering condition has been met.

13. The system of claim 11, wherein the first computing device includes a first display device defining a user interface device of the first computing device, and the second computing device includes a second display device defining the user interface device of the second computing device.

14. The system of claim 11, wherein the first computing device is a head mounted computing device, and the second computing device is a mobile computing device, and wherein the instructions cause the at least one processor to:
 detect a movement of the mobile computing device from a stored position toward a position within a field of view of a user of the head mounted computing device corresponding to the field of view of the image sensor; and
 detect that the first triggering condition has been met in response to detecting the movement of the mobile computing device from the stored position.

15. The system of claim 14, wherein the instructions cause the at least one processor to detect the second triggering condition including detecting the second computing device within an image captured by the image sensor of the first computing device.

16. The system of claim 15, wherein the instructions cause the at least one processor to store the detection of the first triggering condition for a period of time.

17. The system of claim 16, wherein the instructions cause the at least one processor to transfer the output of the content including:
 in response to detecting the second triggering condition while the first triggering condition is stored, determine that the output of the content is to be transferred to the second computing device, and transfer the output of the content to the second computing device; and
 in response to detection of the second triggering condition after the period of time has elapsed, determine that the output of the content is to remain with the first computing device.

18. The system of claim 11, wherein the instructions cause the at least one processor to detect the first triggering condition, including:
 receive data from at least one of an accelerometer or a gyroscope of the second computing device; and
 detect the movement of the second computing device based on the data received from the at least one of the accelerometer or the gyroscope.

19. The system of claim 18, wherein the instructions cause the at least one processor to:
 update the machine learning model of the movement of the second computing device based on the data received from the at least one of the accelerometer or the gyroscope of the second computing device associated with the first triggering condition in response to determining that the movement of the second computing device is an intentional movement of the second computing device into the field of view of the image sensor of the first computing device.

20. The system of claim 11, wherein the instructions cause the at least one processor to suspend execution of the content on the first computing device in response to transferring the output of the content from the first computing device to the second computing device.

21. The system of claim 11, wherein the first computing device is a head mounted computing device and the second computing device is a mobile computing device.

22. A non-transitory computer-readable medium storing executable instructions that, when executed by at least one processor of a computing device, cause the at least one processor to, comprising:
 detect that a first triggering condition has been satisfied, the first triggering condition corresponding to a movement of a mobile computing device toward a head mounted computing device;
 count for a period of time in response to detecting that the first triggering condition has been satisfied;
 detect that a second triggering condition has been satisfied, the second triggering condition corresponding to a detection of the mobile computing device within a field of view of an image sensor of the head mounted computing device;
 in response to the second triggering condition being satisfied within the period of time:
 transfer execution of content being executed on the head mounted computing device to the mobile computing device;
 execute the content on the mobile computing device; and
 provide expanded access to additional information related to the content via a user interface device of the mobile computing device, the expanded access to the additional information being previously inaccessible via the execution of the content on the head mounted computing device; and in response to the second triggering condition not being satisfied within the period of time, determine that the execution of the content is to remain with the head mounted computing device.

23. The non-transitory computer-readable medium of claim 22, wherein the executable instructions cause the at least one processor to detect the movement of the mobile computing device based on data received from at least one of an accelerometer or a gyroscope of the mobile computing device.

24. The non-transitory computer-readable medium of claim 22, wherein the executable instructions cause the at least one processor to suspend execution of the content on the head mounted computing device in response to transferring the content to the mobile computing device and executing the content on the mobile computing device.

* * * * *